(12) United States Patent
Ikeda

(10) Patent No.: US 8,794,130 B2
(45) Date of Patent: Aug. 5, 2014

(54) ARRANGEMENT FOR A GRILL

(75) Inventor: Tadaharu Ikeda, Marilia Estado de Sao Paulo (BR)

(73) Assignee: Ikeda Empresarial Ltda, Marilia, Estado de Sao Paulo (BR)

( * ) Notice: Subject to any disclaimer, the term of this patent is extended or adjusted under 35 U.S.C. 154(b) by 602 days.

(21) Appl. No.: 13/115,535

(22) Filed: May 25, 2011

(65) Prior Publication Data

US 2011/0283892 A1    Nov. 24, 2011

Related U.S. Application Data

(63) Continuation-in-part of application No. 11/575,581, filed as application No. PCT/BR2004/000181 on Sep. 23, 2004.

(51) Int. Cl.
*A47J 37/04* (2006.01)

(52) U.S. Cl.
USPC ................. 99/419; 99/421 V; 99/447; 99/449

(58) Field of Classification Search
CPC .................................................. A47J 37/0688
USPC ............. 99/421 V, 419, 449, 447, 421 P, 415; 426/523
See application file for complete search history.

(56) References Cited

U.S. PATENT DOCUMENTS

| | | | | |
|---|---|---|---|---|
| 3,009,410 A | * | 11/1961 | Murphy | 99/421 V |
| 4,372,199 A | * | 2/1983 | Brown et al. | 99/341 |
| 4,589,333 A | * | 5/1986 | Murphy | 99/419 |

* cited by examiner

*Primary Examiner* — Jianying Atkisson
(74) *Attorney, Agent, or Firm* — Michael J. Striker

(57) ABSTRACT

A grill has a base platter, a bell-shaped container, a heat diffuser, and a set of vertical skewers and baskets, with each of the skewers having a skewer rod for receiving a meat to be roasted and a handle located at one end of the rod, and each of the baskets having a middle rod and articulated baskets mounted on the middle rod, between which the meat to be roasted can be fixed, and a handle provided on one end of the middle rod, such that tips of rods of the skewers and the baskets are supported by braces of the base platter, intermediate extensions of the skewers and the baskets supporting the meat extend vertically along the bell-shaped container, and upper ends of the rods of the skewers of the baskets close to the handles remain coupled with the streaks of the upper wall of the bell-shaped container.

12 Claims, 9 Drawing Sheets

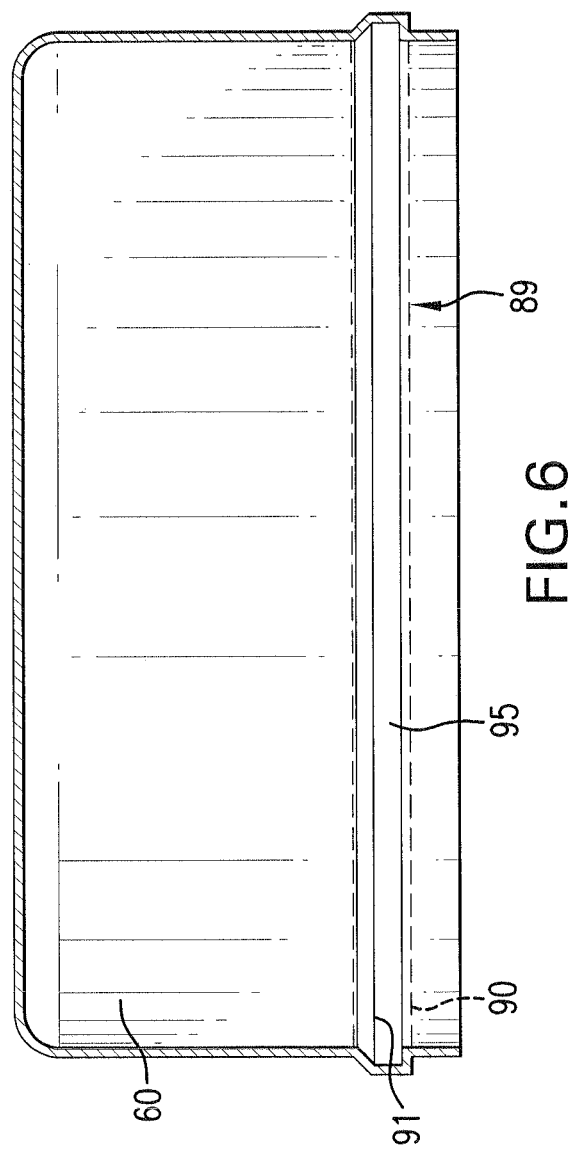

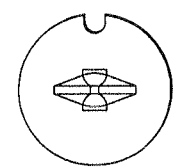
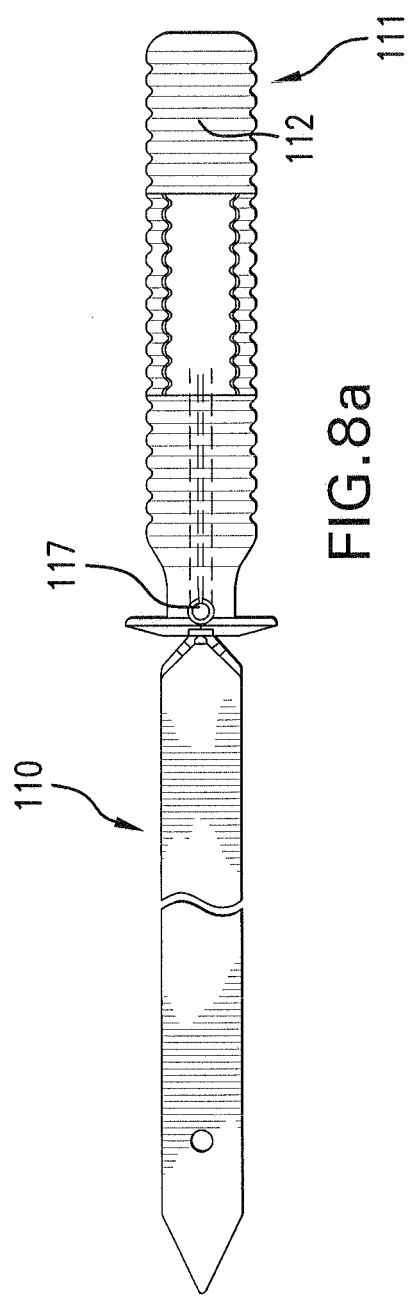
FIG.8a
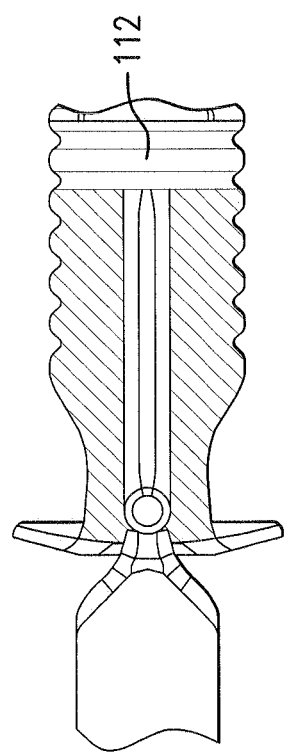
FIG.8b

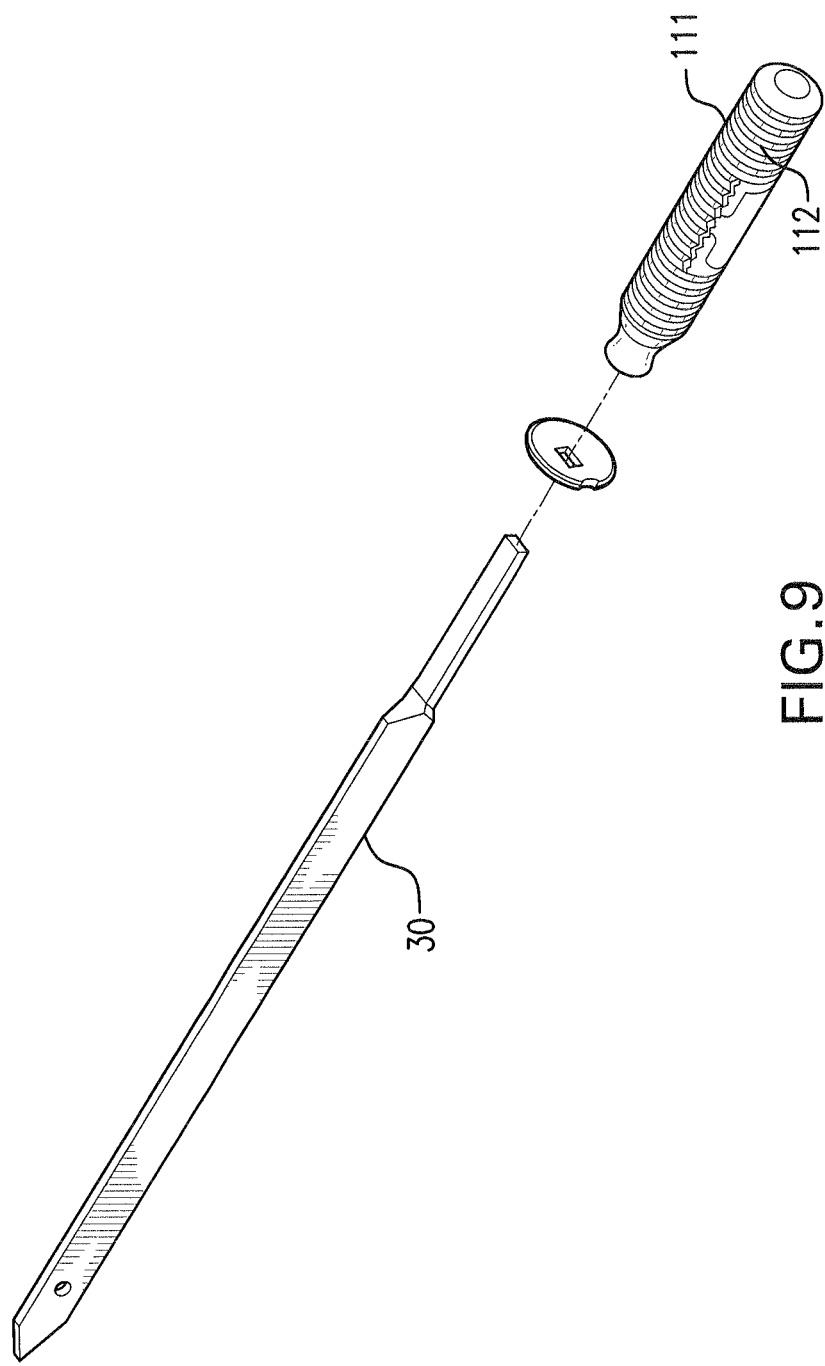

ARRANGEMENT FOR A GRILL

CROSS-REFERENCE TO RELATED APPLICATION

The present application is a continuation-in-part of co-pending U.S. application Ser. No. 11/575,581 filed Sep. 11, 2007. The invention described and claimed hereinbelow is also described in International Application PCT/BR2004/000181 filed on Sep. 23, 2004. This International Application provides the basis for a claim of priority of invention under 35 U.S.C. 119(a)-(d).

BACKGROUND OF THE INVENTION

The present specification refers to a grill belonging to the field of the home utensils, for preparing the barbecue to the so-called "open flame" style using a gas burner, for instance on a range top of an oven.

One of the most traditional ways of preparing a barbecue to the so-called "open flame" style, according to which cuts of meat are fixed to skewers or grilling baskets, and which are then arranged vertically around the flame.

Market surveys have found out that it would be desirable to transfer this traditional way of barbecuing to modern food preparation means, for example, a gas burner on a range top of an oven.

Such surveys have also shown that it would be desirable that such barbecue equipment could provide the meat with the traditional barbecue "open flame" taste; not produce smoke during its use; be portable, easy-to-use and easy-to-clean, and also capable of meeting other specifications required by modern home tools.

SUMMARY OF THE INVENTION

Thus, the objective of the present invention is to provide a portable, dismountable grill for the preparation of "open flame" style barbecue, and which can be used on a gas burner, whose construction, working and advantages are described below on basis of the attached drawings, in which:

BRIEF DESCRIPTION OF THE DRAWINGS

FIG. 6 shows the grill in the bell-shaped stabilizing ridge on the upper body;

FIGS. 8a and 8b shows an embodiment of a ridged handle provided on each of the skewers; and FIG. 9 shows an exploded perspective of a skewer with the ridged handle of FIGS. 8a and 8b.

DETAILED DESCRIPTION OF THE PREFERRED EMBODIMENTS

Figure 1:
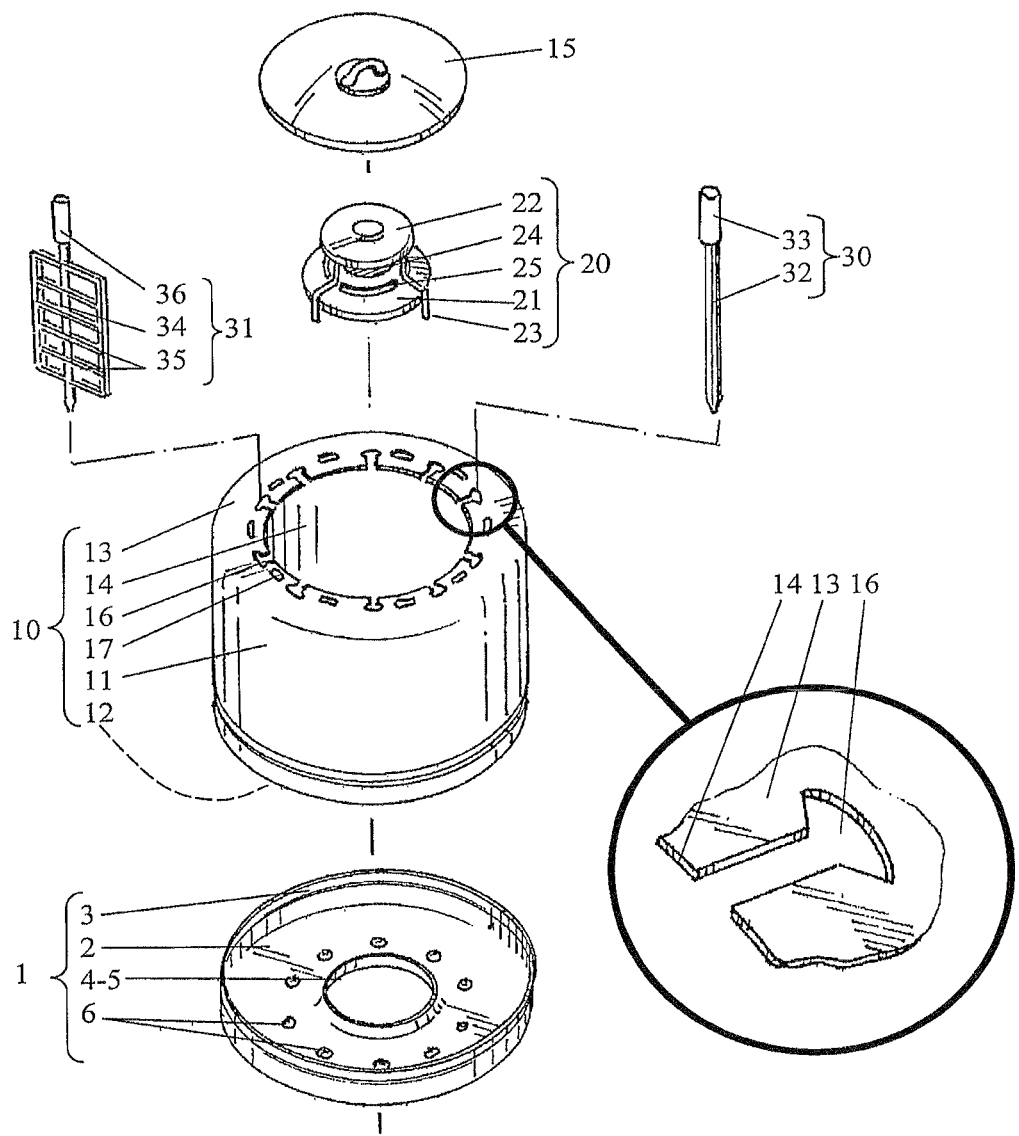
FIG. 1 shows an exploded perspective view of the grill, and an enlarged detail showing the skew supporting hole.

As shown in FIG. 1, the grill of the present invention is intended to "open flame" barbecue on a gas burner, which essentially comprises: a base platter 1; a bell-shaped container 10; a heat diffuser 20; and a set of skewers 30 and vertical baskets 31.

The base platter 1 is formed by: a bottom part 2 selected to be supported over a gas burner 50 of a gas burner; and a not too high peripheral wall 3, where the upper bell-shaped container 10 is coupled and supported; such bottom part 2 being provided with: a middle opening 4 for receiving the flame from the gas burner 50, and surrounded by an inner directing edge 5; and a plurality of circumferential rib-shaped braces 6 for supporting the skewer tips 30 or baskets 31, such braces being regularly arranged following a circumferential alignment around the middle opening 4.

A bell-shaped container 10 is defined by a cylindrical wall 11 provided with an open lower end 12, which is internally coupled and fixed to the wall 3 of the base platter 1; and a upper wall 13 extending from the cylindrical wall provided with a wide middle opening 14, which receives the closing cap 15; said upper wall 13 is further provided with streaks, or slots, 16 for supporting the skewers 30 or baskets 31 arranged correspondingly to the respective circumferential ribs 6 supporting the skewer tips 30 and baskets 31 located in the base platter 1. Each streak 16 consists of a rectilinear section radially extending from the middle opening 14, introduction and removal of skewers/baskets, and an enlarged end for supporting the skewers/baskets. The upper wall 13 is further provided with steam/heat escape openings 17 each of them arranged between streaks 16 for supporting the skewers/baskets.

Figure 3:
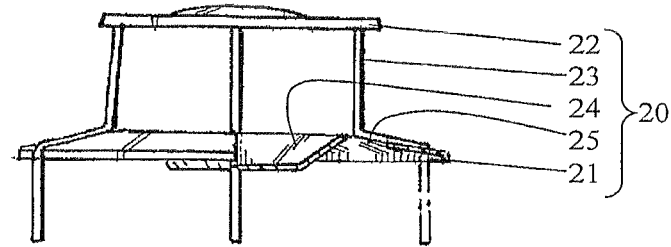
FIG. 3 shows a detail of the grill diffuser with a partial section.

As FIG. 3 shows, the heat diffuser 20 is arranged immediately above the middle opening 5 of the base platter 1 and is formed by: a lower platter 21; a upper deflector 22; and feet 23; said lower platter 21 featuring a middle section having the shape of the platter itself 24 supporting an amount of charcoal 52 in order to provide the meat with the typical barbecue taste; and curved, oblong openings 25 arranged around the middle section 24; the upper deflector 22 is disk-shaped and rests above the middle section 24 and openings 25 of the lower platter 21; and feet 23 interconnecting the lower platter 21 with the diffuser 22 having sections projected downwards the lower platter 21, and supported over a section of the base platter 1 around the inner edge 5.

Figure 2:
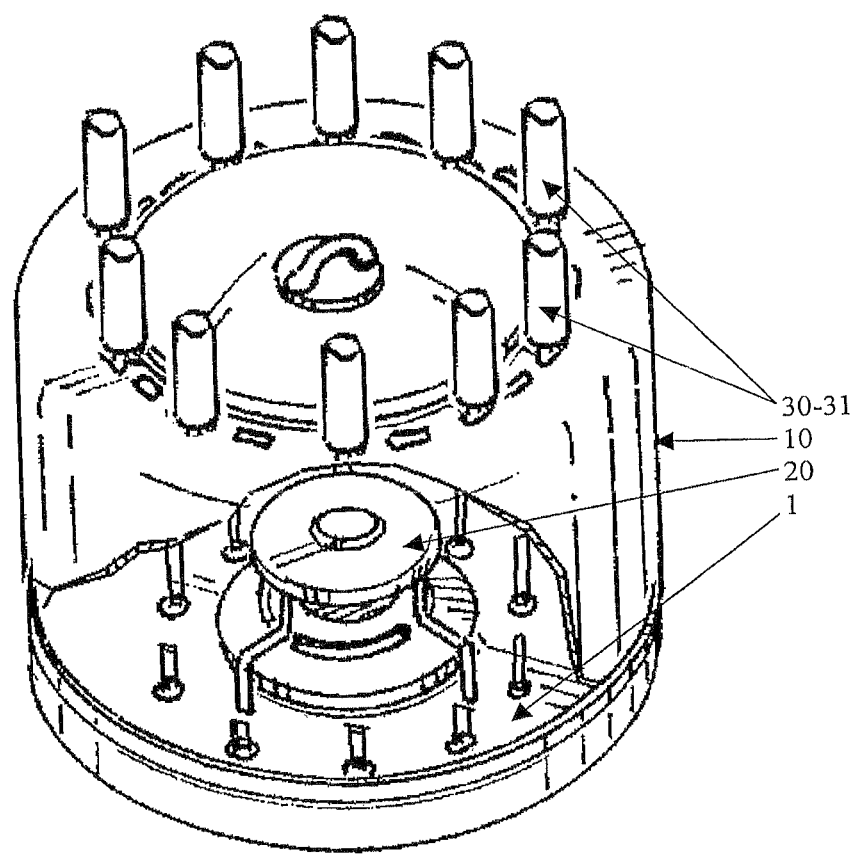
FIG. 2 shows the grill as mounted, and a partial section thereof.
Figure 4:
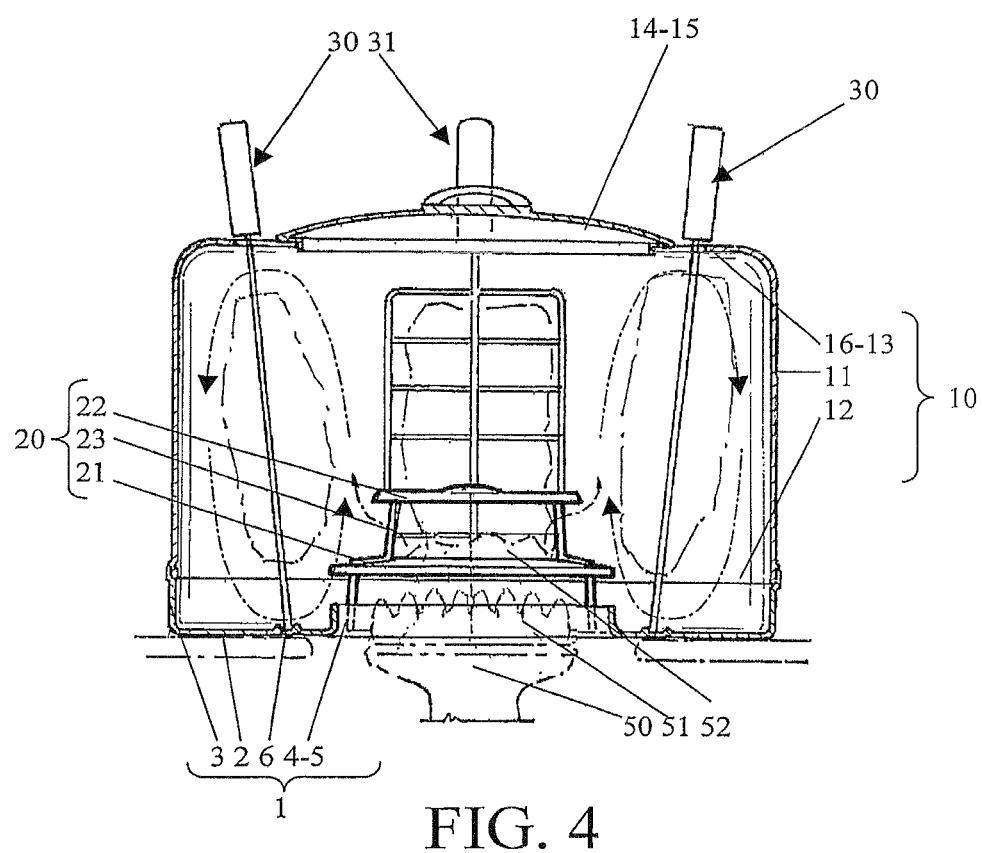
FIG. 4 shows a section view of the grill as mounted and in use.

As shown in FIGS. 2 and 4, preferably, the skewers 30 comprise a flat rod 32, which pierces the meat to be roasted and a handle 33 located at one end of the rod. The baskets 31 consist of a central rod 34; two articulated baskets 35 mounted on the rod, between which the meat to be roasted is kept fastened, and a handle 36 provided at the rod end. The rod tips 32 and 34 of said skewers 30 and baskets 31 are supported over circumferential braces 6 of the base platter 1; the intermediate extensions of said skewers and baskets supporting the meat, extend vertically along the bell-shaped container 10 and the upper ends of rods 32 and 34 of said skewers and basket located close to handles 33 and 36, get coupled with streaks 16 of the upper wall 13 of the bell-shaped container 10, and the handles 33 and 36 are located above the upper wall 13 of the bell-shaped container. Rods 32 and 34 are preferably flat to work in cooperation with the streaks 16 and provide a better stabilization when arranged at their enlarged ends.

The grill built as described works as follows: the base platter 1 is supported on the gas burner 50 in such way that the flame 51 gets into its middle opening 4. The middle platter 24 of the diffuser 20 receives an amount of charcoal 52, and is supported over the base platter 1 so that the lower platter 21 containing the middle platter 24 and the diffuser 22 are above the middle opening 4 of the base platter 1. The bell-shaped container 10 is coupled inside the peripheral wall 3 of the base platter 1. The skewers 30 and baskets 31 holding the meat to be roasted are introduced through the middle opening 14 of the upper wall 13 of the bell-shaped container 10, and their tips are supported over circumferential braces 6 of the base platter 1, and their upper sections located close to handles 33, 36, are coupled with streaks 16 of the upper wall 13 of the bell-shaped container 10. A cap 15 is applied to the opening 14 of the bell-shaped container 10. The gas burner 50 is lit. The flame heat ignites the charcoal 52 contained in the middle platter 24, and the diffuser 20 inside the bell-shaped container 10 spreads it all around until reaching up the cuts of meat held by the skewers 30 and basket 31 arranged around the middle opening 4 of the base platter 1, and as a consequence, around flame 51 of the gas burner 50. The heat coming from the gas burner and charcoal acts to roast the meat while providing the meat with the taste as if it were prepared with the heat and flame coming from the charcoal only, as occurs with the traditional preparation of the "open flame" barbecue. Furthermore, in order to turn the meat, the skewers 30 or basket 31 is removed from the streak 16 through its narrow, rectilinear section, then rotated around itself and reinserted into the streak 16 to stabilize its enlarged end.

Therefore, the grill enables the preparation of a barbecue to the "open flame" style by using modern cooking resources, namely the a gas burner, for instance on the range top of an oven.

Further, the fact of using charcoal inside the grill allows the roasted meat to gain a taste similar to that it would if it had been prepared with the traditional barbecue resources. Further, the grill construction is proper to enable the equipment to be a portable, easy-to-use utensil, further to being easy to clean after the barbecue is done.

Figure 5:
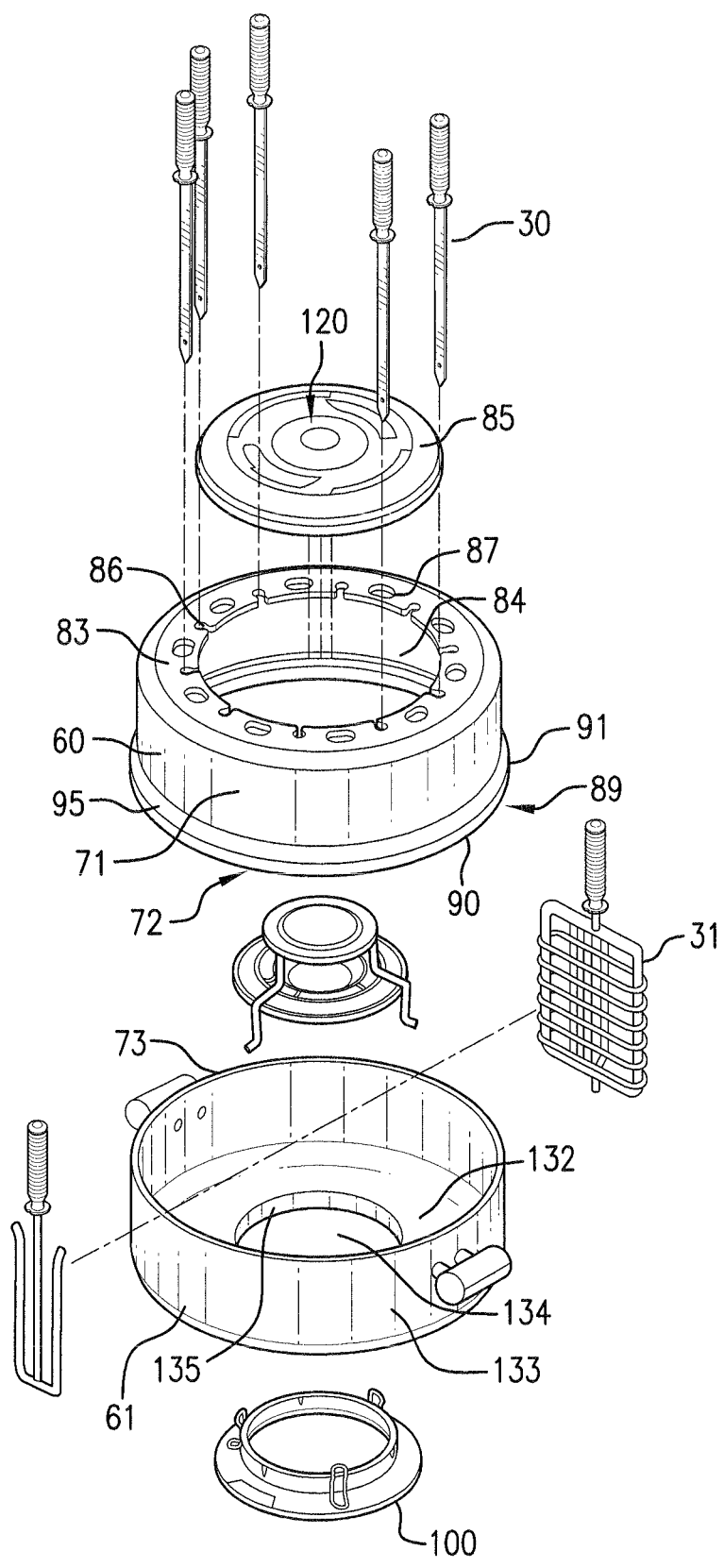
FIG. 5 shows an exploded perspective view of a further embodiment of the grill.

As shown in FIG. 5, a further embodiment of the grill according to the present invention includes upper and lower body portions 60, 61 configured to fit together when the grill is in the assembled state. Similar to the embodiment shown in FIG. 1, a bell-shaped upper body 60 is defined by a cylindrical wall 71 provided with an open lower end 72, which is internally coupled and fixed to the wall 73 of the lower body portion 61; and a upper wall 83 extending from the cylindrical wall 71 provided with a wide middle opening 84, which receives the closing cap 85. The upper wall 83 is further provided with streaks, or slots, 86 for supporting the skewers 30 or baskets 31. Each streak 86 consists of a rectilinear section radially extending from the middle opening 84, introduction and removal of skewers/baskets, and an enlarged end for supporting the skewers/baskets. The upper wall 83 is further provided with steam/heat escape openings 87 each of them arranged between streaks 86 for supporting the skewers/baskets.

As shown in FIGS. 5, 6a, and 6b, the upper body 60 includes a bell-shaped, stabilizing ridge 89 formed by two radially projecting surfaces 90, 91 that extend approximately 90 degrees from an outer surface that connects the surfaces 90, 91 and support a larger diameter ring that surrounds the upper body.

The lower 90° surface 90 is used to support the upper body 60 over the lower body 61 in a stable fashion even if the lower body 61 or the upper body 61 is slightly out of round.

The upper matching surface 91 supports the upper body 60 over the lower body 61 for storage. The upper radially projecting surface 91 sits on the top rim of the lower body 61 when the lid is turned upside down to hold upper body stable when it is inserted into the base for storage.

The outer surface 95 that connects the two radially extending surfaces 90, 91 is a ring that is a larger diameter that the rest of the upper body 60. It may be straight or formed with a radius. However, the height of the ring is specifically dimensioned so the upper body 60 sits in the proper position for cooking and also in the proper position for storage so the cosmetic surfaces of the upper body 60 are not scratched by contacting the bottom of the lower body 61.

The two projections 90, 91 that form the sides of the projecting ring 89 provide radial support to keep the upper body 60 round. Having the two individual surfaces provides twice the radial support of just a simple straight flange that is found on many lids used on other cooking pans. This is important so that the diameter of the ring is not significantly larger than the base, or lower body, diameter and can still provide significant radial strength.

The lower body portion 61 is formed by: a bottom part 132 selected to be supported over a gas burner 50 of a gas oven; and a vertically extending peripheral wall 133 projection from said bottom part 132, where the upper body portion 60 is coupled and supported; the bottom part 132 is provided with a middle opening 134 for receiving the flame from the gas burner 50, and surrounded by an inner directing edge 135.

Figure 7A:
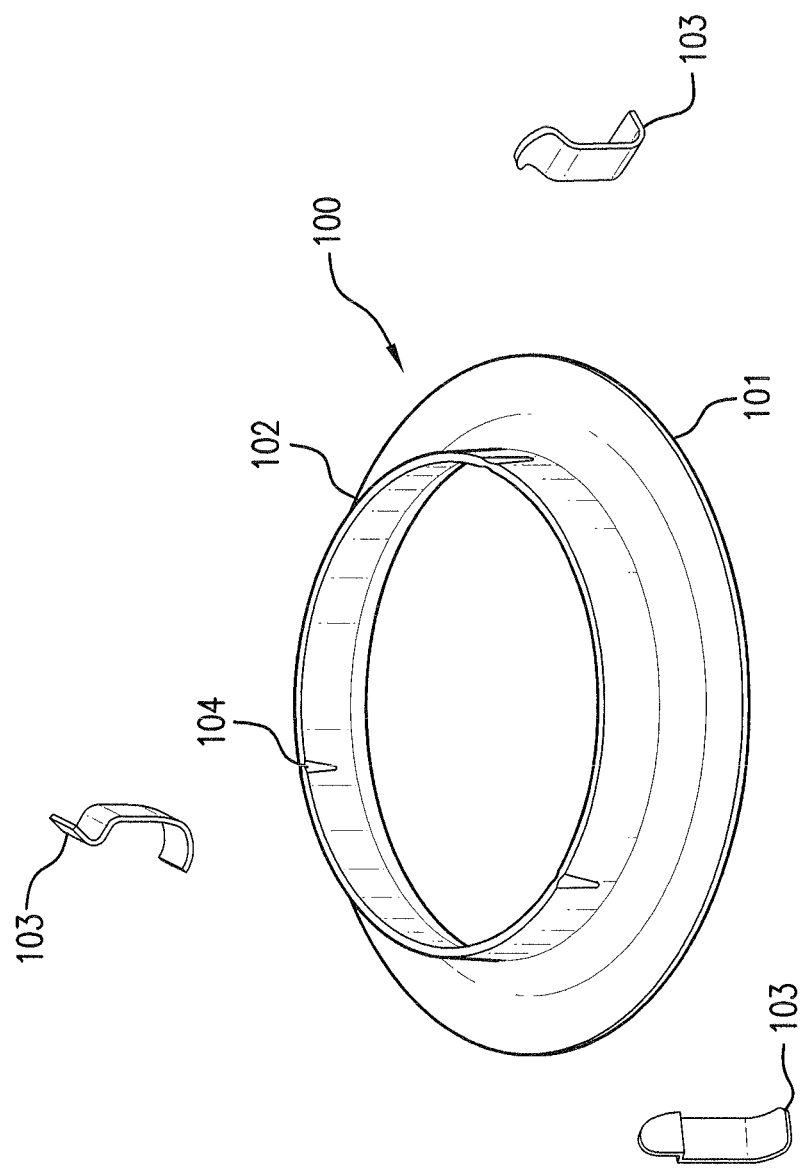
FIGS. 7a and 7b show perspective and top view of the safety ring, respectively.
Figure 7B:
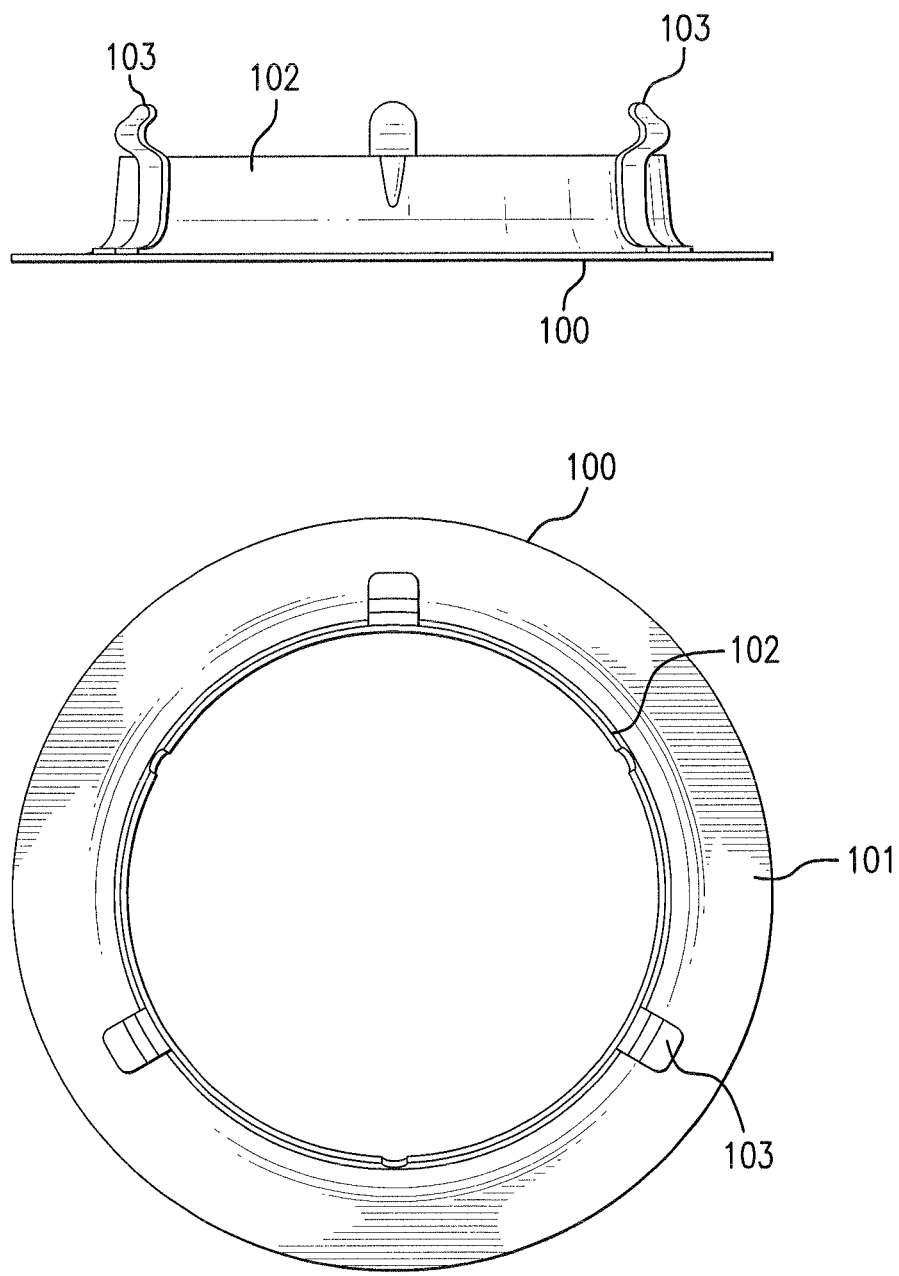

As also shown in FIGS. 5, 7a, and 7b, the grill can include a safety ring 100, preferably made of stainless steel, although other materials are also contemplated. The safety ring 100 includes a base 101 and upwardly extending, annular wall portion 102, which snaps into position into the bottom of the lower body 61. The safety ring 100 includes safety ring locks 103 that engage in corresponding recesses 104 on annular portion 102 for securing the safety ring 100 into the bottom portion of the lower body 61. The safety ring 61 is formed to direct heat into the grill while keeping the lower body 61 cooler, to the point where the grill unit does not smoke. In other words, the safety ring prevents the lower body 61 from superheating and smoking during the cooking process, thus providing the above-described "smoke-free" grilling.

As shown in FIGS. 8a, 8b, and 9, the skewers 110 can be provided with handles 111 which provide a lower temperature to the user by incorporating a series of raised rings 112 to provide a larger surface area for cooling than is available on a round handle without the radial rings. The radial rings 112 also reduce the contact area to the skin to reduce heat transfer to the user's hands. The handle 111 is dimensioned so the internal surfaces contact each other at the same time, or slightly sooner than the outside surfaces to eliminate stresses on the plastic handle when assembled with the attachment screw 113. The handle 111 is a two piece handle that is assembled and held together by the same screws 117 that are used to attach it to the upper portion 114 of the skewers 110.

The cover 85 can include a handle 120 with a ribbed gripping surface like that provided on the skewers 110. The ribs add additional surface area to aid in keeping the skewers' handles cooler than the smooth round handles and again, reduce the amount of surface contact area that contacts the users' skin or reduce the amount of heat transferred to their hands. The ribs have additional surface area on the sides of each rib so the outer diameter is the furthest distance away from the center stainless steel skewer that is heating the handle form the inside out. With the additional surface area on the sides of the ribs acting as heat sinks, and the additional surface area available to dissipate the heat into the atmosphere, the outer most surface of the ribs is the coolest part of the handle, which is also the only surface that comes in contact with the users' hands. The ribbed handled reduces the possibility of burning the users' hands because the outer most diameter is cooler to the touch.

Likewise, the lower body portion 61 also may be provided with handles having the same ribbed or ridged surface to allow the user to pick up or otherwise manipulate the lower body portion 61 or the entire grill when upper and lower body portions 60, 61 are assembled together without risk of burning his or her hands.

According to the basic above-described construction, the grill according to the present invention can incorporate changes related with materials, dimensions, constructive and/or configuration details, without departing from the scope of the protection claimed.

In accordance with the foregoing, the casing may be either split into two parts or made as one single piece.

It will be understood that each of the elements described above, or two or more together, may also find a useful application in other types of constructions differing from the types described above.

While the invention has been illustrated and described as embodied in an arrangement for a grill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A grill comprising:
    a lower body portion having a bottom part supportable over a gas burner and provided with a middle opening for a flame;
    a set of vertical skewers and baskets;
    an upper body portion having a cylindrical wall, a lower portion of said cylindrical wall including a projecting ring coupled with said lower body portion, said upper body portion having an open lower end and an upper wall extending from said cylindrical wall and having a middle opening, said upper wall being provided with streaks for supporting said skewers and baskets, said upper wall further provided with steam outlet streaks each arranged between said streaks for supporting said skewers and baskets,
    wherein said projecting ring is formed by upper and lower radially projecting surfaces joined by an outer surface, said upper and lower radially projecting surfaces extending at an angle from the outer surface, wherein said lower radially projecting surface is configured to support the upper body over the lower body during a cooking process, wherein said upper radially projecting surface is configured to support the upper body over the lower body when said upper body is inverted for storage in said lower body, where said outer surface connecting said upper and lower radially extending surfaces comprises a ring having a larger diameter than a remainder of said upper body;
    a closing cap for closing said middle opening provided in said upper wall; and
    a heat diffuser arranged above said middle opening of said bottom part of said lower body portion, each of said skewers having a skewer rod for receiving a meat to be roasted and a handle located at one end of said rod, and each of said baskets having a middle rod and articulated baskets mounted on said middle rod, between which the meat to be roasted can be fixed, a handle provided on one end of said middle rod, and upper ends of said rods of said skewers and said baskets close to said handles remaining coupled with said streaks of said upper wall of said upper body portion.

2. A grill as defined in claim 1, further comprising a safety ring configured for positive connection to a bottom of said lower body, said safety ring being adapted to direct heat into said grill while simultaneously maintaining a temperature of the lower body during cooking that will prevent smoke from forming.

3. A grill as defined in claim 1, wherein tips of rods of said skewers and said baskets are supported by braces provided in said lower body, with intermediate extensions of said skewers and said baskets supporting the meat extending vertically along said bell-shaped container.

4. A grill as defined in claim 1, wherein each of said handles includes a plurality of raised rings providing a larger surface area adapted for cooling said handle and reducing contact area for a hand of a user on said handle.

5. A grill as defined in claim 4, wherein each of said handles is a two-piece handle having internal and external surfaces, wherein said internal surfaces of said handle contact each other at the same time or sooner than outside surfaces of said handle to eliminate stresses on the handle during assembly.

6. A grill as defined in claim 4, wherein the two-piece handle is held together a screw connection.

7. A grill as defined in claim 1, wherein said upper wall of said upper body portion has a plurality of circumferential ribs formed between said streaks and directly supporting said tips of said skewers and said baskets.

8. A grill as defined in claim 1, wherein each of said streaks includes a section radially extending from said middle opening of said upper wall of said bell-shaped container and each having an enlarged end.

9. A grill as defined in claim 1, wherein said heat diffuser has a lower platter, an upper deflector, and feet, said lower platter having a middle section and curved, oblong openings around said middle section.

10. A grill as defined in claim 9, wherein said upper deflector is disk-shaped and rests above said middle section and said openings of said lower platter, said feet interconnecting said lower platter with said deflector and having sections projecting downwards of said lower platter and supported on a section of said base platter around an inner directing edge of said base platter.

11. The grill as defined in claim 1, wherein said closing cover includes a handle having plurality of raised rings providing a larger surface area adapted for cooling said handle and reducing contact area for a hand of a user on said handle.

12. The grill as defined in claim 1, wherein said upper body portion includes a handle having plurality of raised rings providing a larger surface area adapted for cooling said handle and reducing contact area for a hand of a user on said handle.

* * * * *